Dec. 7, 1937. L. H. BACHELIS Re. 20,567

BATHING SUIT REMOVABLE WHILE DRESSED

Original Filed Nov. 8, 1933

Inventor.
Leonard H. Bachelis
By
William M. Gentle
His Attorney.

Reissued Dec. 7, 1937 Re. 20,567

UNITED STATES PATENT OFFICE 20,567

BATHING SUIT REMOVABLE WHILE DRESSED

Leonard H. Bachelis, Los Angeles, Calif., assignor, by direct and mesne assignments, to Olympia Knitting Mills, Inc., Olympia, Wash., a corporation of Washington Original No. 1,995,531, dated March 26, 1935, Serial No. 697,130, November 8, 1933. Application for reissue May 29, 1935, Serial No. 24,099

3 Claims. (Cl. 2—224)

This invention relates to an improvement in a bathing suit, and the principal object is to provide a garment that can be placed on or removed from a person (ease of removal being particularly important) while he is dressed or sufficiently clothed to avoid indecent exposure while preparing to take a public plunge, or dressing afterwards. To that end I provide bathing trunks, the upper end portion of which preferably terminates at the waist, and at each side is slit from top to bottom down over the hips, to provide front and back pieces connected through the crotch. The adjacent edges of each such piece, along the slit, are provided with quick-detachable fasteners, such as slide fasteners, which when connected and latched hold the edges together and the trunks snugly fitted to a person's body, and which, when unlatched and disconnected, permit the trunks to be placed on or removed while the body is fully clothed; that is, to put on the trunks it is only necessary to extend the back or front portion, as the case may be, through the crotch, to hold it up so that the front and back of the person of the wearer are covered, and then to connect and latch together the fastener elements along the adjacent side slits. Similarly, to remove the trunks it is only necessary to unlatch and disconnect the slide fasteners at each side, whereupon the front and back portions of the suit remain joined together only through the crotch, and then to pull either the front or the back, as the wearer may prefer, through the crotch.

It is obvious that when the front and back pieces are connected by the fastening elements, constituting a closed metal seam, the bathing suit will cover the crotch, hips and waist portions of the wearer's body from objectionable exposure, so that the usual clothing can be removed.

It is also obvious that after a person has finished bathing he can then put on his usual clothing, at least his trousers, after which the slide fastener elements may be unlatched and disconnected by reaching down under the trousers, and the trunks can then be removed by catching them either at the front or back and then drawing them out between the wearer's legs and from under the usual clothing.

Another object of the invention is to provide an inner crotch cover or supporter for a bathing suit that can be sewed into the suit, or if preferred, can be used separately; one which when used separately is adjustable around a person's waist and attachable above the hips, so that it can also be put on or off while the person is clothed, and which when used as a part of a pair of trunks gives independent freedom to the parts held by the supporter, regardless of the movement of the trunks or their lack of movement.

A feature of the invention is shown in providing a trunk of exceedingly neat and pleasing appearance, that is formed compactly and also strongly reinforced at the crotch or narrowest portion of the garment upon which falls the strain of pulling through, and the edges of the crotch portions of the garment are hemmed so that they are very strong and are also curved so the outer one fits snugly around the wearer's legs, and the inner one acts as the usual athletic supporter, but is movable independently of the trunks themselves.

Other objects, advantages and features of the invention may appear from the accompanying drawing, the detailed description and the appended claims.

The accompanying drawing illustrates the invention, in which many parts are indicated semi-diagrammatically.

Figure 1:
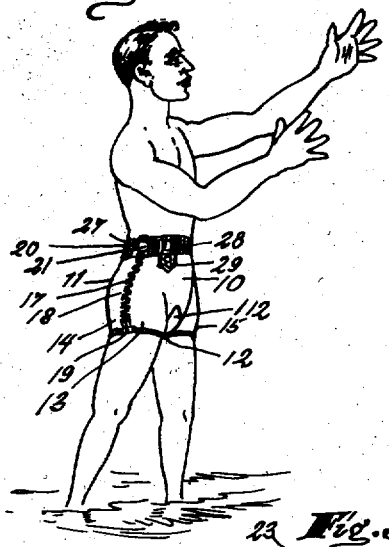
Figure 1 is a perspective view of trunks constructed in accordance with this invention, showing them in use.
Figure 3:
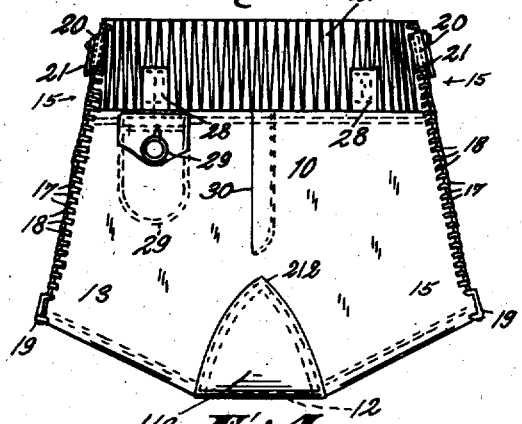
Figure 3 is an enlarged front view of the trunks analogous to that shown in Figure 1 with the edges of the hip portions connected as they would be when the trunks are in use.

In detail the garment includes the front and rear portions 10 and 11 that are integral through the short crotch portion 12. The parts 10 and 11 are similar as to length, width and general form except that the front part is preferably provided with a buttoned pocket 29 and a false fly 30. The parts 10 and 11 are cut so they form the integral hip portions 13 and 14 and sides 15 and 16.

The adjacent edges of the hip and side portions are provided with complementary metal fasteners 17 and 18 by which the adjacent edges are connected when the garment is worn and are disconnected when it is to be removed.

These fasteners are of usual construction and are shown in the drawing only for the purpose of illustration, it being understood that any fastener adapted to latch and form a metal seam that can be completely separated as by the manipulation of a sliding body from end to end of a slit, may be used.

Figure 2:
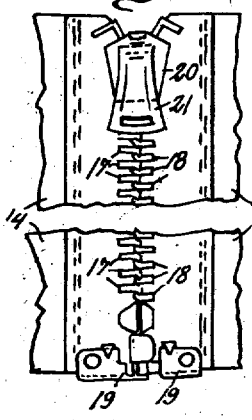
Figure 2 is an enlarged fragmentary side view showing the preferred form of detachable edge fasteners employed.

As best illustrated in Figure 2 this form of fastener includes the separable support or anchor 19 at its lower end and the usual slide body 20 by which the complementary parts 17 and 18 are brought together in an interlocking manner, and separated by a reverse movement; and the body 20 is provided with the usual latching lever 21 which is operated in the usual way to hold the body in a fixed position or to release it so it can be moved to disconnect the parts 17 and 18. No claim is made for this fastener apart from its use in connection with this bathing garment, consequently it is not shown and described in complete detail, it being understood that its purpose is to detachably latch and hold the adjacent edges of the portions 13 and 14 and 17 and 18 together when the garment is in use, and completely separable when the garment is to be removed.

Figure 4:
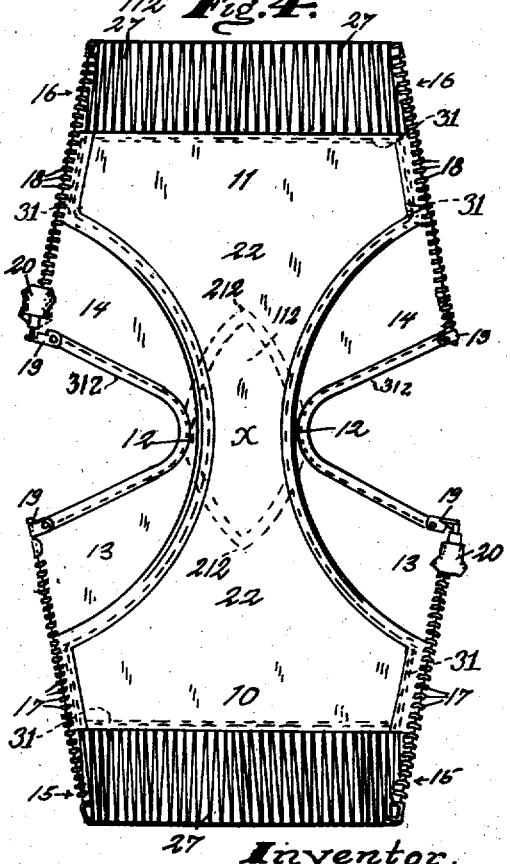
Figure 4 is a view analogous to Figure 3, with the side fasteners disconnected and the front portion of the garment folded down to show the supporter and the trunks, and also showing the open position of the garment when ready to be placed on or when it is removed from a wearer.
Figure 5:
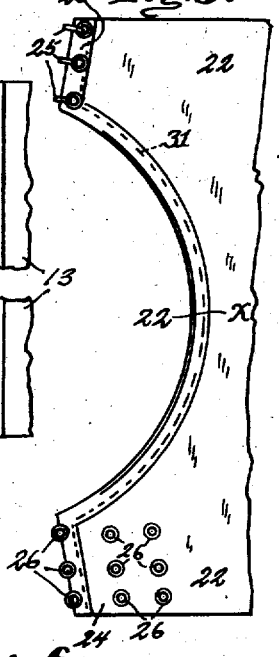
Figure 5 is a fragmentary view of a modified form of a supporter disconnected from the suit and provided with a plurality of hook and eye fasteners, whereby it can be adjustably secured to a person's waist.
Figure 6:
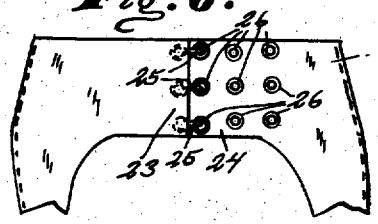
Figure 6 is a fragmentary view of the upper portion of the modified form of supporter showing a hook and eye fastener connected on one side thereof.

The trunks are provided with an inner crotch cover or supporter 22 which can be sewed into the garment as best shown in Figure 4; or if desired, this supporter 22 can be formed and worn separately as fragmentarily indicated in Figures 5 and 6.

As seen therein the adjacent edges 23 and 24 that extend centrally and vertically over a person's hips and sides are provided with the hooks 25 and eyelets 26 so they can be easily and quickly secured to hold the supporter in place, and preferably there are a plurality of the sets of eyelets 26 so the waist portion of the supporter can be properly adjusted around the wearer's waist. The supporter is narrower at the crotch than the trunks; and its ends are extended sidewise to the full width of the garment; and has the ends and side edges secured by sewing to the waist of the trunks. These extended ends are arranged to completely encircle a person's body at the waist line to reinforce the trunks and also to aid in supporting the weight of the supporter when wet.

The top portion 27 of the waist is preferably formed of or incorporates elastic material and may also be provided with belt straps 28 so a person can wear a belt if so desired.

Also I may provide a buttoned pocket 29 in the front of the garment in which valuables such as rings can be placed for safe keeping while bathing.

I also provide a false fly 30 down the front portion of the garment to enhance its appearance.

The crotch portion 12 of the trunks is preferably reinforced with an elliptical shaped gusset 112 that has its pointed end portions 212 extended upward some distance along the front and back parts 10 and 11. Also this crotch portion 12 is slightly wider than the narrowest portion of the supporter 22, and its opposite semi-elliptical edges are preferably reinforced with hems 312, and curved so they fit snugly around the upper portions of a wearer's thighs. The supporter is arranged to hold the privates up in close contact with the body to avoid unsightly protrusions, and permits freedom of movement relative to and independently of the trunks themselves. The gusset 112, likewise the hemmed edges 312, constitutes reinforcement to take the strain of pulling the garment through the crotch, and they prevent the trunks being stretched at this point.

Preferably the supporter has its waist portions the same width as the parts 10 and 11 and extended up to the elastic portions 27; these waist portions may be secured at their ends to the portions 10 and 11 by stitches 31, so the center portion of the supporter can swing or move independently of the trunks.

The edges of the supporter are preferably hemmed and curved in toward a center point X as best shown in Figures 4 and 5.

While the value of the garment will be found chiefly in the ability to take it off from beneath outer clothing, since the wearer may usually put it on while at home, and put on trousers over it, it is nevertheless possible to insert the back portion 11, for example, through the crotch, to draw it up at the back, and then to connect the fastener elements 17 and 18 along each side seam, thus to put on the trunks, while still clothed in trousers. It is obvious, from what has been said, that the trunks can be removed while clothed by a reversal of the foregoing described actions in putting the suit on, reaching down inside the trousers to release the slide fasteners 17 and 18 by moving the slide body 20 downwardly, and disconnecting the separable anchor 19, then drawing the back portion 11 through the crotch. If the supporter is worn separately, the hooks 25 may be disengaged from the eyelets 26, and this, too, may be drawn through in the same manner.

What I claim as my invention is:

1. A bathing suit that has its upper end terminating at the waist in a two-piece elastic band, said suit being so constructed that it can be placed on and removed while the wearer is fully clothed, and including a front body portion secured to one piece of said elastic band and adapted to extend half way around the lower part of the wearer's body and hips, a back body portion, that is of substantially the same width, length and form as the front portion secured to the second piece of said elastic band and adapted to extend around the other half portion of the wearer's body and hips, detachable metal fasteners for connecting the adjacent side edges of said front and back body portions into closed metal seams, an outer crotch cover integral with the lower parts of said front and back portions of said suit, and an inner crotch cover having a narrow center portion and having ends of substantially the same width as the length of the lower edges of said elastic half-bands and joined edge to edge therewith so that the narrow center portion of said inner crotch cover is held centrally above said outer crotch cover.

2. A bathing suit that has its upper end terminating at the waist in a two-piece elastic band, said suit being so constructed that it can be placed on and removed while the wearer is fully clothed, and including a front body portion secured to one piece of said elastic band and adapted to extend half way around the lower part of a wearer's body and hips, a back body portion, that is of substantially the same length, width and form as the front portion secured to the second piece of said elastic band and adapted to extend around the other half of the wearer's body, detachable metal latching fasteners for joining the adjacent edges of said front and back body portions, edge to edge, in metal seams, an outer crotch cover integral with the front and back portions of said suit, a reinforcing strip having two pointed ends, and a wider intermediate portion, secured centrally and on the outside of said outer crotch cover, an inner crotch cover narrower than said outer cover and having end portions of the same width as the upper edge of said front and rear body portions of said suit and secured thereto so that its center portion is free to move independently of the body portions of the suit and outer crotch cover thereof.

3. A swimming garment terminating at its upper edge in waist gripping means to support the garment upon a wearer, and including a front portion incorporating a portion of the waist gripping means and formed to extend half-way around the lower part of the wearer's body and hips, a back portion that is of substantially the same width, length and form as the front portion, and incorporates the remainder of the waist gripping means, and formed to extend around the other half portion of the wearer's body and hips, separable slide fasteners for connecting the meeting side edges of the front and back portions into closed seams, said front and back portions being joined through the crotch to form an outer crotch cover, and an inner crotch cover supported from said waist gripping means and joined to the front and to the back portions adjacent to the waist of each, and being unsecured thereto through the crotch portion, for free movement independently of and relative to the outer crotch cover.

LEONARD H. BACHELIS.